(12) United States Patent
Bernard et al.

(10) Patent No.: US 8,194,131 B2
(45) Date of Patent: Jun. 5, 2012

(54) DEVICE FOR CAPTURING THE SILHOUETTE OF AN INDIVIDUAL

(75) Inventors: Emmanuel Bernard, Paris (FR); Joël-Yann Fourre, Paris (FR); Laurent Lambert, Paris (FR)

(73) Assignee: Sagem Securite, Paris (FR)

(*) Notice: Subject to any disclaimer, the term of this patent is extended or adjusted under 35 U.S.C. 154(b) by 524 days.

(21) Appl. No.: 12/376,062

(22) PCT Filed: Jul. 27, 2007

(86) PCT No.: PCT/EP2007/006672
§ 371 (c)(1),
(2), (4) Date: Oct. 29, 2009

(87) PCT Pub. No.: WO2008/014936
PCT Pub. Date: Feb. 7, 2008

(65) Prior Publication Data
US 2010/0045792 A1   Feb. 25, 2010

(30) Foreign Application Priority Data
Aug. 3, 2006 (FR) .................................. 06 07136

(51) Int. Cl.
*N04H 7/18* (2006.01)
*N04H 5/30* (2006.01)

(52) U.S. Cl. .................. 348/143; 348/162; 348/127
(58) Field of Classification Search .............. 348/88, 348/127, 143, 151, 153, 162–164
See application file for complete search history.

(56) References Cited

U.S. PATENT DOCUMENTS
5,283,551 A   2/1994  Guscott

FOREIGN PATENT DOCUMENTS
| | | |
|---|---|---|
| EP | 0 150 697 A | 8/1985 |
| EP | 0 551 175 A1 | 7/1993 |
| EP | 0 624 857 A1 | 11/1994 |
| FR | 2 409 364 | 6/1979 |

*Primary Examiner* — Patrice Winder
*Assistant Examiner* — Ebrahim Golabbakhsh
(74) *Attorney, Agent, or Firm* — Gerald E. Helget; Briggs and Morgan, P.A.

(57) ABSTRACT

A device for capturing a silhouette consisting of a transparent wall, a vision device to capture at least one image of the wall and a processing unit connected to the vision device which analyses the captured images and detects the silhouette of the individual passing between the transparent wall and the vision device. More than one pattern is positioned on the transparent wall and the patterns exhibit a contrast with the transparent wall.

9 Claims, 3 Drawing Sheets

DEVICE FOR CAPTURING THE SILHOUETTE OF AN INDIVIDUAL

CROSS REFERENCE TO RELATED APPLICATIONS

The present application is based on and claims priority to International Application PCT/EP2007/006672 filed on Jul. 27, 2007 and French Patent Application No. 06/07136 filed on Aug. 3, 2006, the contents of which are hereby incorporated by reference in their entirety.

BACKGROUND OF THE INVENTION

The present invention concerns a device for capturing the silhouette of an individual, a set of several of these capture devices and a lobby using such a capture device. The invention finds an application in the field of the analysis and recognition of the silhouette of an individual and in particular of an individual passing through a security lobby.

In order to check that only one individual is entering a building, a lobby is provided at the entrance to this building. Such a lobby may comprise a small room with an entry and exit and a uniqueness detection device provided for checking that only one individual is passing through the lobby.

A uniqueness detection device is known, comprising a floor mat consisting of a matrix of sensors and an electronic processing unit connected to the various sensors. The feet of an individual passing through the lobby come to press on the sensors and these various pressure zones, and the processing unit deduces from this the number of feet passing through the lobby and therefore the number of individuals passing simultaneously through the lobby. Such a uniqueness detection device does not give complete satisfaction since it does act make it possible to distinguish when an individual is passing through the lobby carrying another individual on his back. The uniqueness detection device in fact detects a single pair of feet whereas two individuals have passed through the lobby.

In order to resolve this problem, another uniqueness detection device has been developed. This uniqueness detection device comprises an electronic processing unit and a device for capturing the silhouette of the individual passing through the lobby. The silhouette capture device is designed to capture an image of the silhouette of the individual passing through the lobby in order to transfer this image to the processing unit, which analyses it in order to deduce therefrom that only one individual is actually passing through the lobby. A capture device of this type comprises a vertical opaque wall covered with a chequerboard of black and white squares and a camera whose lens is oriented so as to film this chequerboard. When an individual passes between the lens and the chequerboard, the camera captures a control image on which the individual and chequerboard appear. The control image is then transferred to the processing unit, which analyses it in order to be able to check that only one individual has actually passed.

Analysis of the control image may consist for example of subtracting the image of the chequerboard from the control image in order to extract the silhouette of the individual therefrom. The silhouette of an individual alone or the silhouette of an individual who is carrying another are perfectly differentiable and the processing unit is designed to make a distinction between these two silhouettes.

Even if such a device for capturing the silhouette of individuals gives good results, its does not give complete satisfaction.

This is because a uniqueness detection device or a security lobby comprising such a capture device does not, because of the presence of the opaque wall, enable a controller posted outside the uniqueness detection device or security lobby to see inside the latter. In the event of detection of a problem by the processing unit, the controller must then move in order to check the actual presence or not of the incident.

In addition, the presence of opaque walls is prejudicial vis-a-vis persons passing through the uniqueness detection device or security lobby since these persons may have a sense of being shut in.

The document EP-A-0 551 175 discloses a device for detecting a person passing in front of a wall illuminated by IR LEDs, the beams of which are reflected in the wall and are picked up by a camera. The wall is opaque and fabricated from wood or stone and, where the material constituting the wall is not sufficiently reflective for IR, a specific paint is applied to the wall. A person skilled in the art is therefore not led to replace the opaque wall with a transparent wall as the present invention so provides below, since the document of the prior art would lead him to cover such a transparent wall with a non-transparent paint.

SUMMARY OF THE INVENTION

An object of the present invention is to propose a device for capturing the silhouette of an individual which does not have the drawbacks of the prior art.

To this end, there is proposed a device for capturing a silhouette comprising:
  a wall,
  a vision device provided for capturing at least one image of the said wall, and
  a processing unit connected to the said vision device in order to analyse the or each image captured and to detect the silhouette of the said individual passing between the said wall and the said vision device,
the capture device being such that the wall comprises a transparent wall and a plurality of patterns positioned on the said transparent wall and exhibiting a contrast with the said transparent wall.

Advantageously, the patterns are disposed repetitively.

According to a particular embodiment, each pattern consists of a set of reflectorized markers.

Advantageously, the vision device comprises a camera whose lens is oriented towards the wall and an illumination device designed to illuminate the wall.

Advantageously, the illumination device forms a ring centred on the axis of the camera lens.

Advantageously, the illumination device emits in the infrared range and the camera is an infrared camera.

Advantageously, the illumination device emits light beams in the form of flashes.

Advantageously, the flashes are synchronised with the camera acquisition frequency.

Advantageously, the light beams emitted are pulsed.

The invention also proposes a security lobby comprising:
  an entrance door,
  an exit door, and
  a device for capturing the silhouette of an individual according to one of the preceding variants disposed between the entrance door and the exit door.

The invention also proposes a set of several devices for capturing the silhouette of an individual according to one of the preceding variants, such that the light beams emitted by each vision device have at least one physical characteristic different from those emitted by the other vision devices of the said set and the processing unit is adapted to detect this or these characteristics.

BRIEF DESCRIPTION OF THE DRAWINGS

The characteristics of the invention mentioned above, as well as others, will emerge more clearly from a reading of the following description of an example embodiment, the said description being given in relation to the accompanying drawings, among which:

FIG. 1 depicts a device 100 for capturing the silhouette of are individual 112.

FIG. 1 and, in particular, the paths of the light beams that it describes below are not to scale.

DETAILED DESCRIPTION OF ILLUSTRATIVE EMBODIMENTS

Figure 1:
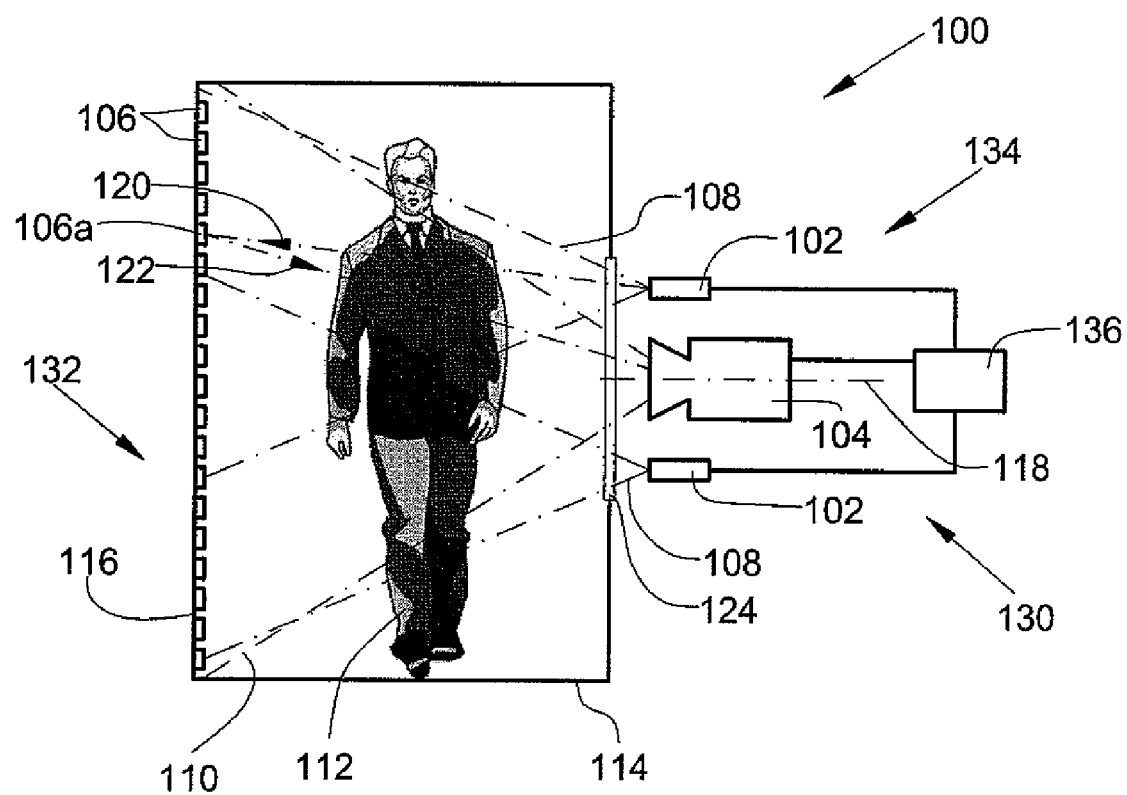
FIG. 1 depicts a front view of a device for capturing the silhouette of an individual according to the invention.

The capture device 100 comprises a floor 114 on which the individual 112 moves, a wall 132, a vision device 130 and a processing unit 136 connected to the vision device 130. The individual 112 moves between the vision device 130 and the wall 132.

The wall 132 comprises a transparent wall 116 and a plurality of patterns 106. The patterns 106 are positioned on the transparent wall 116 and have a contrast with the transparent wall 116.

Because the wall 116 is produced from a material transparent to the human eye and is not entirely covered by the pattern 106, a controller placed outside the capture device 100 can observe the inside of the latter through this transparent wall 116.

In addition, because of this transparency, the individual 112 passing through the capture device 100 does not feel oppressed.

The vision device 130 captures an image of the wall 132 and therefore of the patterns 106. The processing unit 136 is designed to analyse this image and, by searching for patterns in the image, can determine the silhouette of the individual 112. The analysis of the control image can consist, as in the prior art, of subtracting the image of the wall 132 without individual 112 from the image of the wall 132 with the individual 112 in order to extract therefrom the silhouette of the individual 112. The difference in contrast between the transparent wall 116 and the patterns 106 makes it possible to locate these patterns 106. The contrast must be sufficient to be able to be located by the processing unit 136 on the image captured by the camera 104.

In order to facilitate analysis of the image and, in particular, the search for the patterns 106, the latter are disposed repetitively on the transparent wall 116.

So that this analysis is as precise as possible, it is preferable for the reflectivity coefficient of the patterns 106 and the reflectivity coefficient of the transparent wall 116 to be very different.

The vision device 130 comprises a camera 104, the lens of which is oriented towards the wall 132, and, in order to improve further the contrast between the transparent wall 116 and the patterns 106, the vision device 130 also comprises an illumination device 134 designed to illuminate the wall 132 and therefore the patterns 106. This illumination increases the contrast between the patterns 106 and the transparent wall 116.

The camera 104 has a vision angle 110 designed to enable all the patterns 106 to be seen by the camera 104. The vision angle 110 is centred on the axis 118 of the lens of the cameral 104. The axis 118 is substantially perpendicular to the wall 132.

According to a particular embodiment of the invention, the illumination device 134 comprises a plurality of light sources 102. All the light sources 102 are designed to allow illumination of all the patterns 106 seen by the camera 104. Each light source 102 emits light in the form of an emission cone 108. The light sources 102 may be light emitting diodes.

According to a particular embodiment, the light sources 102 are disposed in a ring centred on the axis 118 of the lens of the camera 104. Such an arrangement makes it possible to obtain an illumination of an intensity substantially identical over all the patterns 106.

The processing unit 136 is connected to the light sources 102 and to the camera 104. The processing unit 136 controls firstly the switching on of the various light sources 102 and secondly the capture of at least one image by the camera 104.

The light beam 120 represents one of the light beams emitted by one of the light sources 102 in the direction of the pattern 106a and the light beam 122 represents the light beam reflected by this pattern 106a, which is captured by the camera 104.

The other walls of the capture device 100 are also transparent, which may cause the illumination of the patterns 106 by light beams emitted from the outside. To prevent these beams coming to be reflected in the patterns 106 in the direction of the camera 104 at the risk of contaminating the image captured by the camera 104, each pattern 106 takes the form of a set of reflectorized markers. Each of these sets here takes the form of a circular tablet that is fixed, for example by adhesive bonding, to the transparent wall 116.

Each reflectorized marker constitutes an optical system returning the light in the opposite direction and along the exact axis from which it comes subject to a diffusion phenomenon. The straight line referenced 120 represents the incident light beam arriving on one of the sets of reflectorized markers 106a and the straight line referenced 122 represents the reflected light beam starting from one of the reflectorized markers forming this set of reflectorized markers 106a. The incident beam 120 and the reflected beam 122 are not merged because of the slight diffusion that takes place during reflection on the reflectorized marker. The non-superimposition of the incident beam 120 and the reflected beam 120 is accentuated by the fact that FIG. 1 is not to scale. The set of light beams 122 reflected by the reflectorized marker forms substantially a so-called reflection cone, the vertex of which is the reflecting reflectorized marker and the angle at the vertex of which is equal to the angle formed by the reflected light beams 122.

"Reflectorized marker" should be understood to be an optical system returning the light in the opposite direction and inside the reflection cone. The angle of the reflection cone is around a few degrees. Each set of reflectorized markers comprises a plurality of reflectorized markers.

The use of sets of reflectorized markers 106 as reflective devices prevents the ambient light coming to interfere with the image taken by the camera 104. This is because the ambient light comes mainly from the sun and lamps in the buildings, that is to say they are disposed at a height and because of the use of the reflectorized markers this ambient light is reflected substantially in the direction of its emission source, that is to say upwards rather than in the direction of the camera 104.

As explained above, the diffusion angle of the reflectorized markers 106 is small and, for the beams 120 emitted by the sight sources 102 and reflecting in the reflectorized markers to be captured by the lens of the camera 104, the light sources 102 must be at a short distance from the axis 118 of the camera 104.

To prevent the image captured by the camera 104 being excessively contaminated by reflections of light beams coming from the transparent wall 116, the latter must have a low reflectivity coefficient compared with that of the reflectorized markers 106.

The operating principle of the capture device 100 is as follows:

In the absence of an individual 112 in the capture device 100, the processing unit 136 demands the switching on of the various light sources 102, which emit light beams 120 in the direction of the wall 132. The light beams thus emitted are reflected by the reflectorized markers in the direction of the lens of the camera 104. The camera 104 then captures the image thus formed and transmits it to the processing unit 136. The processing unit 136 analyses the image thus received and deduces therefrom the absence of any individual 112 in the capture device 100.

When an individual 112 is present in the capture device 100, the processing unit 136 demands the switching on of the various light sources 102, which emit light beams 120 in the direction of the wall 132. The light beams thus emitted that encounter individual 112 are not reflected while the others are reflected by the reflectorized markers in the direction of the lens of the camera 104. The cameral 104 then captures the image thus formed and transmits it to the processing unit 136. The processing unit 136 analyses the image thus received and deduces therefrom the presence of an individual 112, as well as his silhouette.

Figure 2:
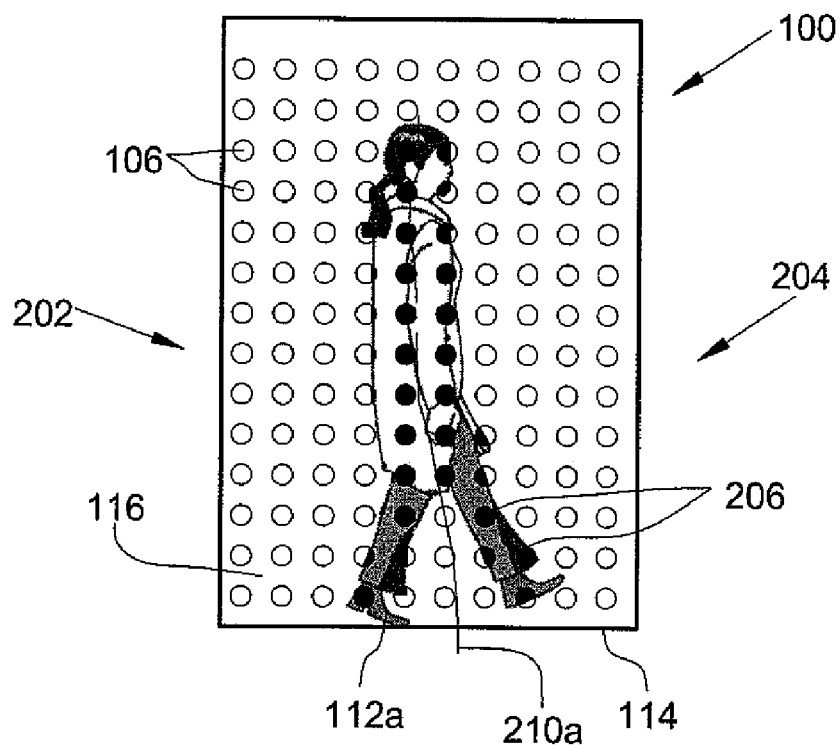
FIG. 2 depicts a side view of a device for capturing the silhouette of an individual according to the invention.
Figure 3:
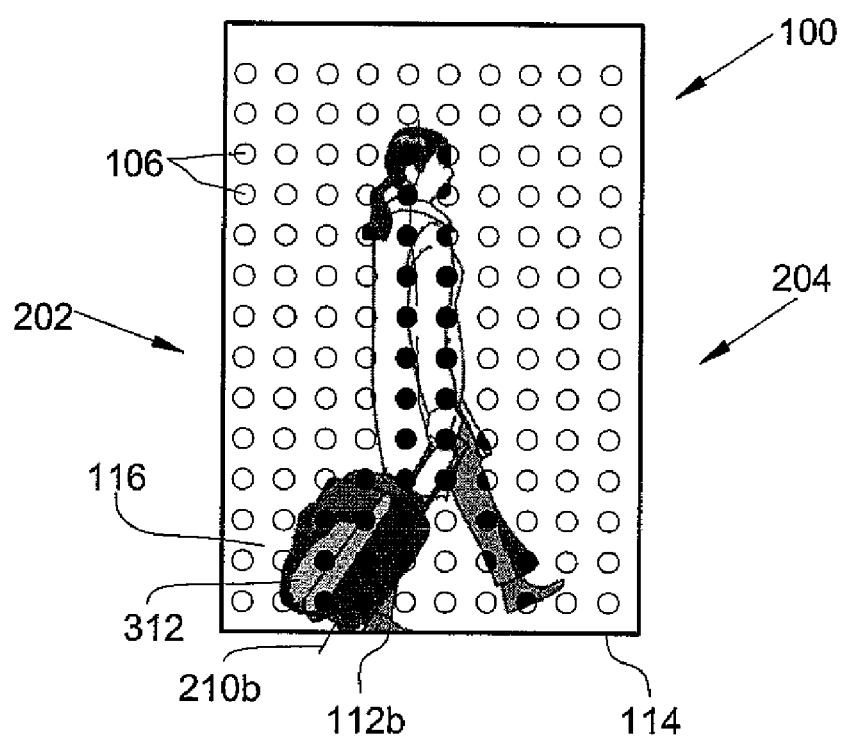
FIG. 3 depicts a side view of a device for capturing the silhouette of an individual according to the invention.

FIG. 2 and FIG. 3 represent two examples of use of the device for capturing a silhouette 100.

In FIG. 2, the individual 112a has a silhouette that does not present any abnormality, while in FIG. 3 the silhouette of the individual 112b presents abnormalities due to the presence of luggage 312 travelling behind him.

The individual 112a, 112b enters the device for capturing a silhouette 100 through one of the ends 202 and leaves through the other end 204. During this traverse, the camera 104 takes at least one image of the sets of reflectorized markers 106 illuminated by the illumination device 134 and transmits it to the processing unit 136.

In FIGS. 2 and 3, the sets of reflectorized markers 106 that are darkened, at least partly, and that are referenced 206, correspond to the sets of reflectorized markers 106 that are hidden behind the individual 112a, 112b and that are therefore not illuminated by the illumination device 134 or not seen by the camera 104.

The image captured by the camera 104 is then analysed by the processing unit 136, which determines the position of the sets of concealed reflectorized markers 206 and derives therefrom the silhouette of the individual 112a, 112b.

In the case in FIG. 2, the position of the sets of concealed reflectorized markers 206 makes it possible to presume that the individual 112a is alone and has no luggage.

This presumption can be determined for example by the fact that the sets of concealed reflectorized markers 206 are all located in a zone that extends substantially symmetrically on each side of a curve 210a. For each horizontal line of sets of reflectorized markers 106, the processing unit 136 determines the barycentre of the sets of concealed reflectorized markers 216 in the said line and the curve 210a represents the curve connecting each of these barycentres.

In the case in FIG. 3, the position of the sets of concealed reflectorized markers 206 makes it possible to presume that the individual 112b has a silhouette comprising abnormalities that may be due to the presence of luggage or a dog.

This presumption can be determined for example by the fact that the sets of concealed reflectorized markers 206 are not all located in a zone that extends substantially symmetrically on each side of a curve 210b and in particular in the bottom part of the image. For each horizontal line of sets of reflectorized markers 106, the processing unit 136 determines the barycentre of the sets of concealed reflectorized markers 216 in the said line and the curve 210b represents the curve connecting each of these barycentres.

In the case of an individual carrying another individual on his back, the deformation is situated at the centre of the image and to the left of the curve 210b.

The number and distribution of the sets of reflectorized markers 106 must be such that there exists a given moment when the silhouette of an individual 112a, 112b passing through the capture device 100 is sufficiently covered by the sets of reflectorized markers 106 for the silhouette to be recognisable.

In order to avoid dazzling of the individual 112a, 112b while passing through the capture device 100, the elimination device 134 emits in the infrared range and the camera 104 is an infrared camera.

Preferably the emission band of the illumination device 134 and the reception band of the camera 104 are identical, that is to say the camera 104 is designed to capture solely the light beams whose wavelength is included in the reception band. This prevents the image captured by the camera 104 being contaminated by external infrared sources.

In order to perfect the filtering of the wavelengths of the light beams emitted by the illumination device 134, a filter 124 is placed between the illumination device 134 and the individual 112, that is to say at the exit from the light sources 102 and at the entry to the lens of the camera 104.

According to a particular embodiment, the emission of light beams by the illumination device 134 takes place in the form of light flashes that are synchronised with the acquisition frequency of the camera 104 to allow better rendition of the image captured by the camera 104. In order to improve further the rendition of the captured image, the light beams are pulsed, that is to say they are emitted with a high power at the moment of capture and are switched off for the rest of the time.

The determination of the silhouette of the individual 112a, 112b passing through the capture device 100 can be effected in various ways. For example, the subtraction made by the processing unit 136 of the image of the sets of reflectorized markers 106 when an individual 112a, 112b is present and of the image of the sets of lenses 106 when no individual 112a, 112b is present, and then the analysis of the result, can be cited. The search made by the processing unit 136 for a repetitive known pattern in the image of the sets of lenses 106 captured by the camera 104 can also be cited. The absence of this pattern represents a masking due to the presence of an individual 112a, 112b. The determination of each concealed pattern 206 then makes it possible to determine the silhouette of the individual 112a, 112b.

According to a particular embodiment of the invention and in the case of a determination by searching for a pattern, the repetitive pattern takes the form of the circle representing a set of reflectorized markers 106. The circles are regularly disposed in lines and columns. Naturally the density of the sets of lenses 106, their shape, their horizontal spacing or their vertical spacing may be modified as long as the sets of reflectorized markers 106 form repetitive patterns identifiable by the processing unit 136.

To prevent external light beams coming to interfere with the capture device 100 and in particular the camera 104, the transparent wall 116 constitutes a filter that blocks the wavelengths identical to the wavelength of the light beams emitted by the light sources 102.

In a particular embodiment of the invention, the emission cone 108 of each light source 102 has an angle of approximately 60 degrees, each set of reflectorized markers 106 has a radius of 2 cm. Each set of reflectorized markers 106 is vertically and horizontally spaced from its neighbours by approximately 10 cm. The distance between the transparent wall 116 and the lens of the camera is 145 mm. Each light source 102 is distance from the axis 118 by approximately 20 mm. The surface of the transparent wall 116 that is covered by the sets of the reflectorized markers 106 is around 5% of the total surface area.

A capture device 100 as described above can be used for various purposes. For example, it can be used in order to count the number of individuals entering a building. It can also be used in a uniqueness device used in a security lobby in order to guarantee that only one individual is passing through the said lobby at a given moment.

Such a security lobby may comprise an entrance door into the lobby, an exit door from the lobby and a capture device 100 disposed between the entrance door and the exit door. The entrance door and the exit door are controlled by the processing unit 136.

An individual 112a, 112b wishing to pass through the lobby enters the entrance door, which preferably closes again behind him. The individual 112a, 112b passes through the airlock and passes through the capture device 100, which analyses his silhouette. If the silhouette corresponds to an individual alone 112a, the exit door opens in order to allow him to leave. If the silhouette corresponds to an individual 112b whose silhouette exhibits abnormalities, the exit door does not open and the processing unit 136 sends a signal to a supervisor so that the latter validates or not the passage of the individual 112b.

Figure 5:
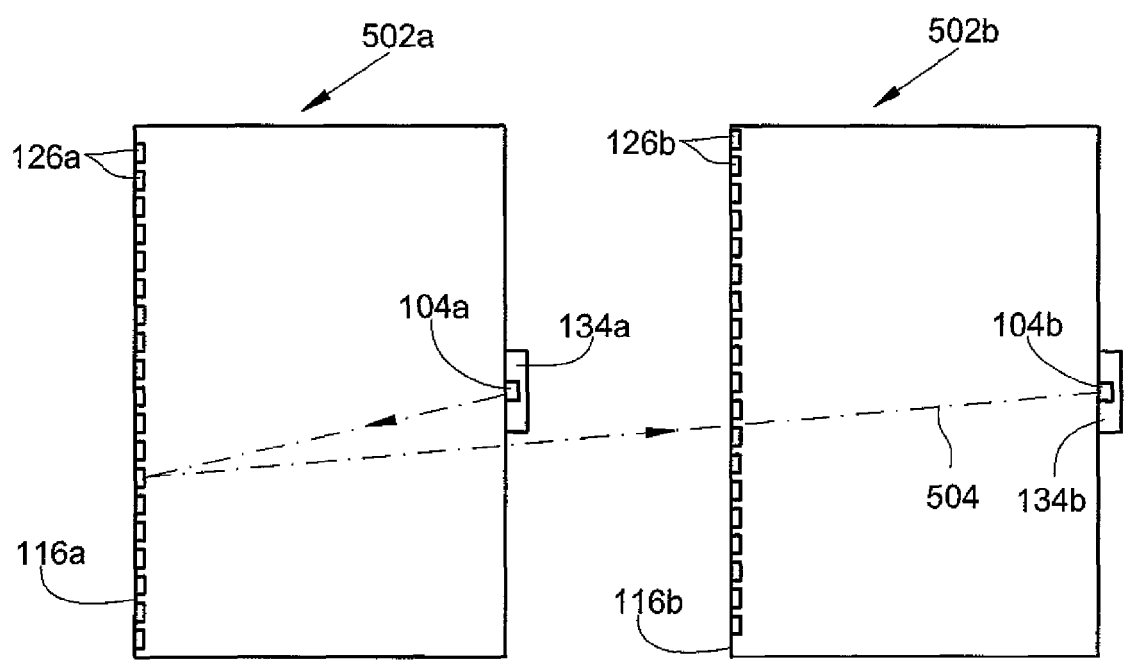
FIG. 5 depicts a set of lobbies according to the invention.

FIG. 5 depicts a set 500 of two security lobbies 502a and 502b that are arranged side by side. This set of two lobbies thus comprises two capture devices as described above.

The first security lobby referenced 502a, comprises a transparent wall 116a, a plurality of reflectorized markers 126a, an illumination device 134a and a camera 104a.

The second security lobby referenced 502b comprises a transparent wall 116b, a plurality of reflectorized markers 126b, an illumination device 134b and a camera 104b.

The second lobby 502b is disposed so that its transparent wall 116b faces the illumination device 134a and the camera 104a of the first lobby 502a.

Because the walls of the lobbies 502a and 502b are transparent to the beams emitted by their illumination devices respectively 134a and 134b, some of these beams 504 emitted by the first lobby 502a may, after reflection on the reflectorized markers 126a of the first lobby 502a, reach the camera 104b of the second lobby 502b. Such a phenomenon gives rise to a faulty assessment with regard to the presence of one or more individuals in the second lobby 502b. This is why, in order to prevent the illumination device 134a of the first lobby 502a interfering with the camera 104b of the second lobby 502b, each illumination device 134a, 134b emits over a wavelength that is particular to it and is different from that of the other illumination devices 134b, 134a. Each camera 104a, 104b is then designed to detect solely the wavelength of the illumination device 134a, 134b that is associated with it.

In general terms, in the case of a set of several lobbies or several capture devices 100, the light beams emitted by each vision device 130 have at least one physical characteristic different from those emitted by the other vision devices 130 in the set and the processing unit 136 is adapted to detect this or these characteristics.

Because of the presence of the various transparent walls 116a and 116b, a controller can easily control all the lobbies.

Figure 4:
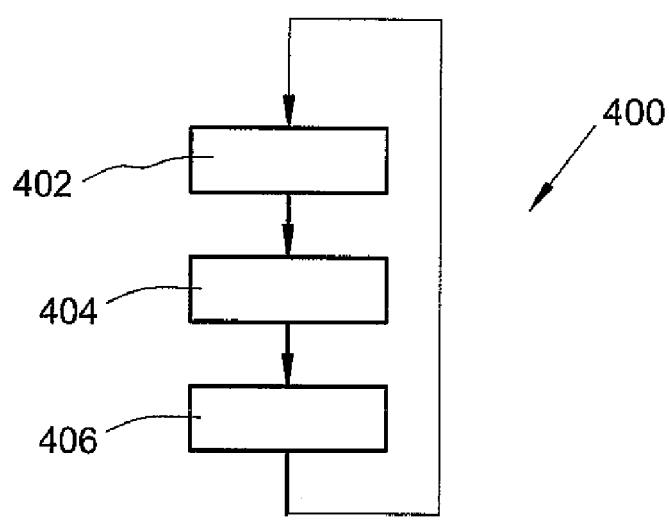
FIG. 4 depicts an algorithm of a method of controlling a capture device according to the invention.

FIG. 4 depicts an algorithm of a method 400 of controlling a capture device 100 as described above.

The control method 400 comprises:
an illumination step 402,
a capture step 404, and
an analysis step 406.

During the illumination step 402, the illumination device 134 emits light beams 120 in the direction of the sets of reflectorized markers 406, preferably in the form of flashes.

During the capture step 404, the camera captures the image of the sets of reflectorized markers 106, 206 and transmits it to the processing unit 136.

During the analysis step 406, the processing unit 136 receives the image thus transmitted and processes it in order to determine the silhouette of the individual 112a, 112b passing through the capture device 100.

In the case of a security lobby, the analysis step 406 can be followed by an alarm step, during which the individual 112b whose silhouette comprises abnormalities is locked in the lobby and signal is sent to a supervisor.

The invention described above is more particularly described in the case where a single image is captured by the camera 100 when the capture device 100 has been passed through, but it is also possible to capture several images during this traverse and to carry out an analysis of the silhouette for each of these images. It is then possible, from this plurality of analyses, to validate or not the silhouette of the individual 112a, 112b. This capture of several images can be done by video recording.

Naturally the present invention is not limited to the examples and embodiments described and depicted but is capable of many variants accessible to persons skilled in the art.

For example, the invention has been described in particular in the case of a silhouette of an individual but can apply in the case of an animal or object.

The capture device of the invention can also be associated with other detection devices in order to cross-reference the results of each of them and thus to confirm or deny the fact that one or more individuals are passing in front of the capture device.

The invention has been described in particular in the case where each pattern is a set of reflectorized markers but it is possible to provide for each pattern to be a white square and all the patterns to form a chequerboard, the black squares of which are formed by the transparent wall.

The invention claimed is:

1. A capture device for capturing a silhouette (100), comprising:
   (a) a wall (132);
   (b) a vision device (130) provided for capturing at least one image of the said wall (132) comprising a camera (104) whose lens is oriented towards the wall (132) and an illumination device (134) designed to illuminate the wall (132) in that the illumination device (134) emits in the infrared range and in that the camera (104) is an infrared camera; and (c) a processing unit (136) connected to the said vision device (130) in order to analyze the or each image captured and to detect the silhouette of an individual passing between the said wall (132) and the said vision device (130); the capture device (100) being such that the wall (132) comprises a transparent wall (116) and a plurality of patterns (106) positioned on the said transparent wall (116) and exhibiting a contrast with the said transparent wall (116).

2. The capture device (100) of claim 1, characterized in that the patterns (106) are disposed repetitively.

3. The capture device (100) of claim 1, characterized in that each pattern (106) consists of a set of reflectorized markers.

4. The capture device (100) of claim 1, characterized in that the illumination device (134) forms a ring centered on the axis (118) of the lens of the camera (104).

5. The capture device (100) of claim 1, characterized in that the illumination device (134) emits light beams in the form of flashes.

6. The capture device (100) of claim 5, characterized in that the flashes are synchronized with the acquisition frequency of the camera (104).

7. The capture device (100) of claim 1, characterized in that the light beams emitted are pulsed.

8. A security lobby comprising:
(a) an entrance door;
(b) an exit door; and
(c) the device of claim 1, for capturing the silhouette of an individual (100) disposed between the entrance door and the exit door.

9. The set of several devices of claim 1, for capturing the silhouette of an individual (100) characterized in that the light beams emitted by each vision device (130) have at least one physical characteristic different from those emitted by the other vision devices (130) of the said set and in that the processing unit (136) is adapted to detect this or these characteristics.

* * * * *

UNITED STATES PATENT AND TRADEMARK OFFICE
CERTIFICATE OF CORRECTION

| | | |
|---|---|---|
| PATENT NO. | : 8,194,131 B2 | |
| APPLICATION NO. | : 12/376062 | |
| DATED | : June 5, 2012 | |
| INVENTOR(S) | : Bernard et al. | |

It is certified that error appears in the above-identified patent and that said Letters Patent is hereby corrected as shown below:

Title Page,

Item (73), Assignee, delete "Sagem Securite, Paris (FR)" and enter --Morpho, Paris (FR)-- therefor.

Signed and Sealed this
Second Day of October, 2012

David J. Kappos
*Director of the United States Patent and Trademark Office*